United States Patent
Thomas

(10) Patent No.: US 9,711,058 B2
(45) Date of Patent: Jul. 18, 2017

(54) PROVIDING TARGETED FEEDBACK

(71) Applicant: International Business Machines Corporation, Armonk, NY (US)

(72) Inventor: John C. Thomas, Solana Beach, CA (US)

(73) Assignee: International Business Machines Corporation, Armonk, NY (US)

(*) Notice: Subject to any disclaimer, the term of this patent is extended or adjusted under 35 U.S.C. 154(b) by 324 days.

(21) Appl. No.: 14/199,178

(22) Filed: Mar. 6, 2014

(65) Prior Publication Data

US 2015/0254997 A1 Sep. 10, 2015

(51) Int. Cl.
*G06F 17/30* (2006.01)
*G09B 7/02* (2006.01)

(52) U.S. Cl.
CPC ......... *G09B 7/02* (2013.01); *G06F 17/30705* (2013.01)

(58) Field of Classification Search
CPC .... G09B 7/02; G06F 17/30705; G06Q 10/10; G06Q 30/02; G06Q 50/01
See application file for complete search history.

(56) References Cited

U.S. PATENT DOCUMENTS

| | | | |
|---|---|---|---|
| 6,767,213 B2 | 7/2004 | Fleishman | |
| 8,281,238 B2 | 10/2012 | Sweeney et al. | |
| 8,312,021 B2 | 11/2012 | Matveeva et al. | |
| 2006/0069589 A1* | 3/2006 | Nigam | G06Q 30/02 706/55 |
| 2010/0031240 A1 | 2/2010 | Drumm et al. | |
| 2010/0235307 A1 | 9/2010 | Sweeney et al. | |
| 2012/0066196 A1* | 3/2012 | Dempski | G06F 17/30864 707/706 |
| 2012/0124052 A1 | 5/2012 | Furey et al. | |
| 2012/0278831 A1* | 11/2012 | van Coppenolle | H04L 65/4084 725/25 |
| 2012/0284259 A1 | 11/2012 | Jehuda | |
| 2012/0296637 A1 | 11/2012 | Smiley et al. | |
| 2012/0296891 A1 | 11/2012 | Rangan | |

(Continued)

FOREIGN PATENT DOCUMENTS

EP 1667041 A2 6/2006

OTHER PUBLICATIONS

Boteanu, et al., "Modeling Discussion Topics in Interactions with a Tablet Reading Primer", IUI'13, Mar. 19-22, 2013, Santa Monica, CA, USA, pp. 75-84, Copyright 2013 ACM 978-1-4503-1965-2/13/03.

(Continued)

*Primary Examiner* — Dinku Gebresenbet
(74) *Attorney, Agent, or Firm* — Maeve Carpenter

(57) ABSTRACT

A method for providing targeted feedback based on a goal of the feedback. The method includes receiving, by one or more computer processors, a goal desired as a result of an exchange of information between a plurality of users. The method then includes monitoring, by the one or more computer processors, the exchange of information between the plurality of users. The method includes mapping, by the one or more computer processors, the monitored information in a database storing ontological relationships. The method then includes determining based, at least in part, on the received goal and the stored ontological relationships, targeted feedback for the plurality of users.

6 Claims, 3 Drawing Sheets

(56) References Cited

U.S. PATENT DOCUMENTS

2012/0303421 A1* 11/2012 Yokoi .................... G06Q 10/06
                                                         705/7.42
2013/0080948 A1    3/2013  Wright et al.
2013/0086698 A1    4/2013  van Coppenolle et al.

OTHER PUBLICATIONS

Fu, et al., "Design Team Convergence: The Influence of Example Solution Quality", Journal of Mechanical Design, Nov. 2010, vol. 132, pp. 111005-1-111005-11, Copyright © 2010 by ASME.

* cited by examiner

PROVIDING TARGETED FEEDBACK

FIELD OF THE INVENTION

The present invention relates generally to the field of cognitive thinking and problem solving, and more particularly to enhancing cognitive task performance by providing targeted feedback based on a desired performance goal of the cognitive task.

BACKGROUND

In cognitive thinking and problem solving environments, individuals and groups attempt to solve difficult cognitive problems. Attempts to enhance performance in problem solving are based on the fundamental notion that human behavior is determined by conscious logical processing. While this is an important aspect of human behavior, it is also true that behavior is influenced by strong "priming" effects based on feedback and stimuli presented to the individuals and groups. Priming effects involve exposure to a stimulus that influences a later response.

SUMMARY

Embodiments of the present invention disclose a method, computer program product, and computer system for providing targeted feedback based on a goal of the feedback. The method includes receiving, by one or more computer processors, a goal desired as a result of an exchange of information between a plurality of users. The method then includes monitoring, by the one or more computer processors, the exchange of information between the plurality of users. The method includes mapping the monitored information in a database storing ontological relationships. The method then includes determining based, at least in part, on the received goal and the stored ontological relationships, targeted feedback for the plurality of users.

The computer program product disclosed by the present invention includes one or more computer-readable storage media and program instructions stored on the one or more computer-readable storage media to receive a goal desired as a result of an exchange of information between a plurality of users. The computer program product then includes program instructions to monitor the exchange of information between the plurality of users. The computer program product includes program instructions to map the monitored information in a database storing ontological relationships. The computer program product then includes program instructions to determine, based, at least in part, on the received goal and the stored ontological relationships, targeted feedback for the plurality of users.

The computer system disclosed by the present invention includes one or more computer processors, one or more computer-readable storage media, and program instructions stored on the one or more computer-readable storage media for execution by at least one of the one or more computer processors to receive a goal desired as a result of an exchange of information between a plurality of users. The computer system then includes program instructions to monitor the exchange of information between the plurality of users. The computer system includes program instructions to map the monitored information in a database storing ontological relationships. The computer system then includes program instructions to determine, based, at least in part, on the received goal and the stored ontological relationships, targeted feedback for the plurality of users.

DETAILED DESCRIPTION

Figure 1:
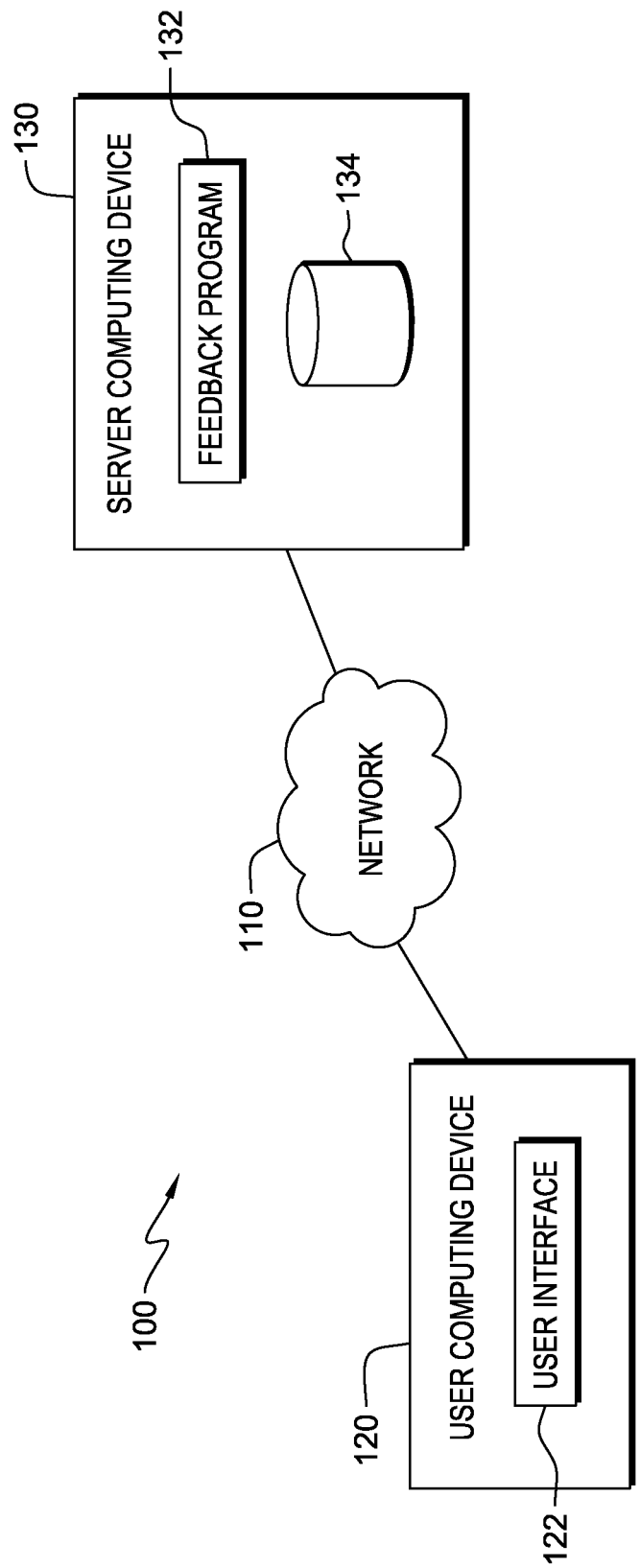
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention recognize that individuals or groups taking part in problem solving often engage in less than optimal behavior such as focusing on tangents rather than a particular aspect of the problem or not accessing information that is relevant to a particular problem. Embodiments of the present invention aim to enhance problem solving performance of the individuals or groups by providing targeted feedback to produce specific priming effects on the individuals or groups based on information organized in a semantic database and a desired goal of the targeted feedback.

The present invention will now be described in detail with reference to the Figures. FIG. 1 is a functional block diagram illustrating a distributed data processing environment, generally designated 100, in accordance with one embodiment of the present invention.

Distributed data processing environment 100 includes user computing device 120 and server computing device 130, interconnected via network 110. Network 110 can be, for example, a local area network (LAN), a wide area network (WAN) such as the Internet, or any combination of the two, and can include wired, wireless, or fiber optic connections. In general, network 110 can be any combination of connections and protocols that will support communication between user computing device 120 and server computing device 130.

User computing device 120 includes user interface (UI) 122. In various embodiments of the present invention, user computing device 120 can be a laptop computer, a notebook computer, a personal computer (PC), a desktop computer, a tablet computer, a handheld computing device or smart-phone, or any programmable electronic device capable of communicating with server computing device 130 via network 110. User computing device 120, while shown as a single device in FIG. 1, may represent a cluster, or several computing devices, connected via network 110 and operated by multiple users or individuals within distributed data processing environment 100. In an exemplary embodiment of the present invention, user computing device 120 is operated by a user or by a group of users engaged in difficult cognitive tasks, such as problem solving. UI 122 may be, for example, a graphical user interface (GUI) or a web user interface (WUI) and can display text, images, messages, documents, web browser windows, user options, application interfaces, and instructions for operation. An operator of user computing device 120 may view feedback from operation of feedback program 132 on UI 122.

Server computing device 130 includes feedback program 132 and database 134. In various embodiments of the present invention, server computing device 130 can be a laptop computer, a tablet computer, a netbook computer, a PC, a handheld computing device or smart-phone, a thin client, a mainframe computer, a networked server computer, or any programmable electronic device capable of communicating with user computing device 120 via network 110. Server computing device 130 may represent a computing system utilizing clustered computers and components to act as a single pool of seamless resources when accessed through a network. This is a common implementation for data centers and for cloud computing applications. Server computing device 130 may include internal and external components as further described with reference to FIG. 3.

Feedback program 132 monitors information exchanged among users or groups of users engaged in difficult cognitive thinking tasks, such as problem solving or brainstorming, within distributed data processing environment 100 and provides targeted feedback to the users or groups of users based on the information exchanged as part of the users discussion, information stored in a semantic database, such as database 134, and a goal of the targeted feedback. A desired goal of the targeted feedback may include convergent thinking, divergent thinking, or targeted thinking of the group engaged in the cognitive thinking task. For example, a group may be discussing development ideas via email or a chat room. Feedback program 132 monitors the information being exchanged, and can code the words exchanged or can determine keywords from the information which can then be indexed in a semantic database. Feedback program 132 can then use the indexed information and relationships stored in the semantic database, and based on a desired goal, for example, targeted thinking, can provide feedback to the group in the form of text or images. The feedback selected from the semantic database is chosen to produce specific priming effects on the users or the groups of users, for example, increasing convergence, divergence, or focusing attention on particular knowledge areas or particular roles. Database 134 may be a semantic space or a semantic database that can store relationships between words, phrases and definitions. The information stored in database 134 is organized and mapped using ontological relationships. Database 134, while included within server computing device 130 in FIG. 1, may be located elsewhere within distributed data processing environment 100 and can communicate with feedback program 132 via network 110.

Figure 2:
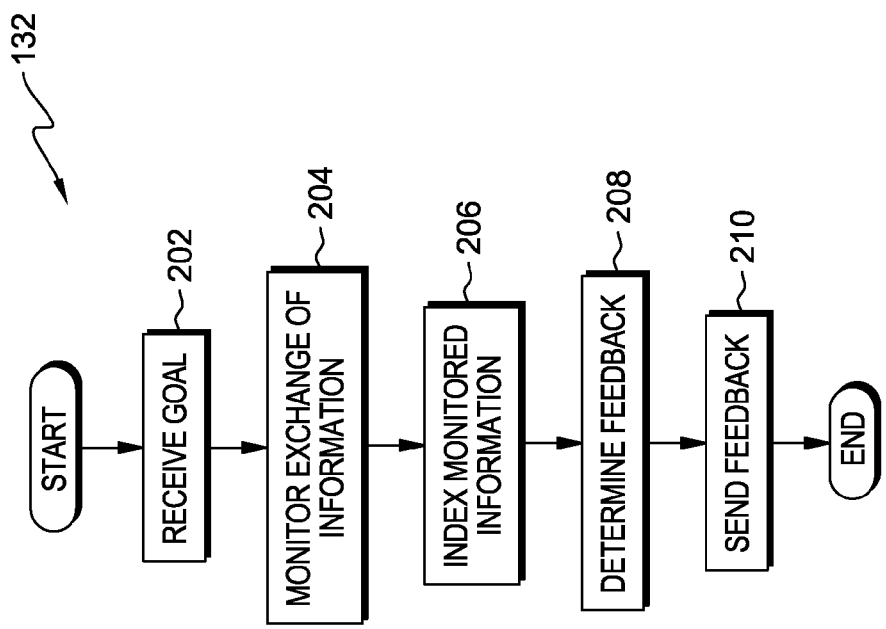
FIG. 2 is a flowchart depicting operational steps of a feedback program, for providing targeted feedback to a user or a group of users based on a desired goal of the targeted feedback, information exchanged by the user or between the group of users, and information stored in a semantic database, in accordance with an embodiment of the present invention.

FIG. 2 is a flowchart depicting operational steps of feedback program 132, for providing targeted feedback to a user or a group of users based on a desired goal of the targeted feedback, information exchanged by the user or between the group of users, and information stored in a semantic database, in accordance with an embodiment of the present invention.

Feedback program 132 receives a goal (step 202). The goal desired as a result of providing targeted feedback to a user or a group of users is provided to feedback program 132 by the user or group of users, or another user or group of users with an interest in the result of information exchange between the user or the group of users. Information may be exchanged in an attempt to perform a difficult cognitive task, such as problem solving, and users may interact with each other and with feedback program 132 by indicating responses, for example, by talking, typing, or choosing links on a web site. The desired goal of the exchange of information can be convergent thinking, divergent thinking, or targeted thinking, such as to focus attention and/or ideas on a particular knowledge area.

Feedback program 132 monitors the exchange of information by a user or between and among a group of users (step 204). Information may be exchanged between a user and server computing device 130 via network 110, or between multiple users each operating on a user computing device 120 and communicating via network 110. The information may be exchanged, for example, via verbal communication, such as conversations within a room or over a telephone, typing on a computer and transmitting the typed text via network 110, such as within a chat room or using an instant messaging service, or any other known manner of communicating information between users of computing devices within a networked environment, such as distributed data processing environment 100. In an exemplary embodiment of the present invention, the information exchanged by or among users within distributed data processing environment 100 is recorded. The information may be recorded by hand, such as by an operator of a user computing device 120, or by recording a chat, email chain, or blog, for example, in which a group of users is participating. Information may also be recorded using speech to text technology, for example, when a group of users is participating in a discussion while operating one or more of a user computing device 120 and via network 110. In various embodiments of the present invention, feedback program 132 can monitor users choices of links on a website.

Feedback program 132 indexes monitored information in database 134 (step 206). In an exemplary embodiment of the present invention, the information exchanged by users or among users is recorded and coded, for example, in terms of words used in the discussion or exchange of information, or keywords derived from the exchange of information, and the coded words are then used as indices in database 134. Database 134, in the exemplary embodiment, is a semantic database such as, for example, one constructed using Latent Semantic Analysis ("LSA"), or a lexical database, such as WordNet®. The information in database 134 is organized using semantic processing and ontological relationships, and the indices, or terms, are then mapped to the ontology.

Feedback program 132 determines targeted feedback (step 208). Using ontological relationships in database 134, feedback program 132 determines feedback based on the desired goal. Targeted feedback and feedback stimuli is chosen based on the desired goal and presented to the user or the group of users in order to alter subsequent behavior in the desired manner. For example, if the desired goal is to increase divergent thinking, items chosen for feedback may be "distant" from items the users have generated already. If the desired goal is to increase convergent thinking, items may be chosen that are near the central part of the space determined by the user responses. If the desired goal is to focus ideas on a particular knowledge area, the targeted feedback provided can be based on items from that particular part of the semantic space.

Feedback program 132 sends feedback to user computing device 120 (step 210). Feedback program 132 provides targeted feedback to the user or the group of users, for example, by providing text, such as displayed on UI 122, providing auditory words, or images. In various embodiments of the present invention, feedback may be provided by any sort of stimulus, including kinesthetic, tactile, auditory, olfactory, or gustatory. In an exemplary embodiment, the goal of the targeted feedback provided to the user or the group of users is to produce specific priming effects, for example, to alter subsequent behavior in the desired way or to enhance performance of the user or the group of users. For example, a specific priming effect may be to guide the users or the group of users towards the desired goal of convergent thinking, divergent thinking, or targeted thinking, for example, thinking targeted to solving a problem.

Figure 3:
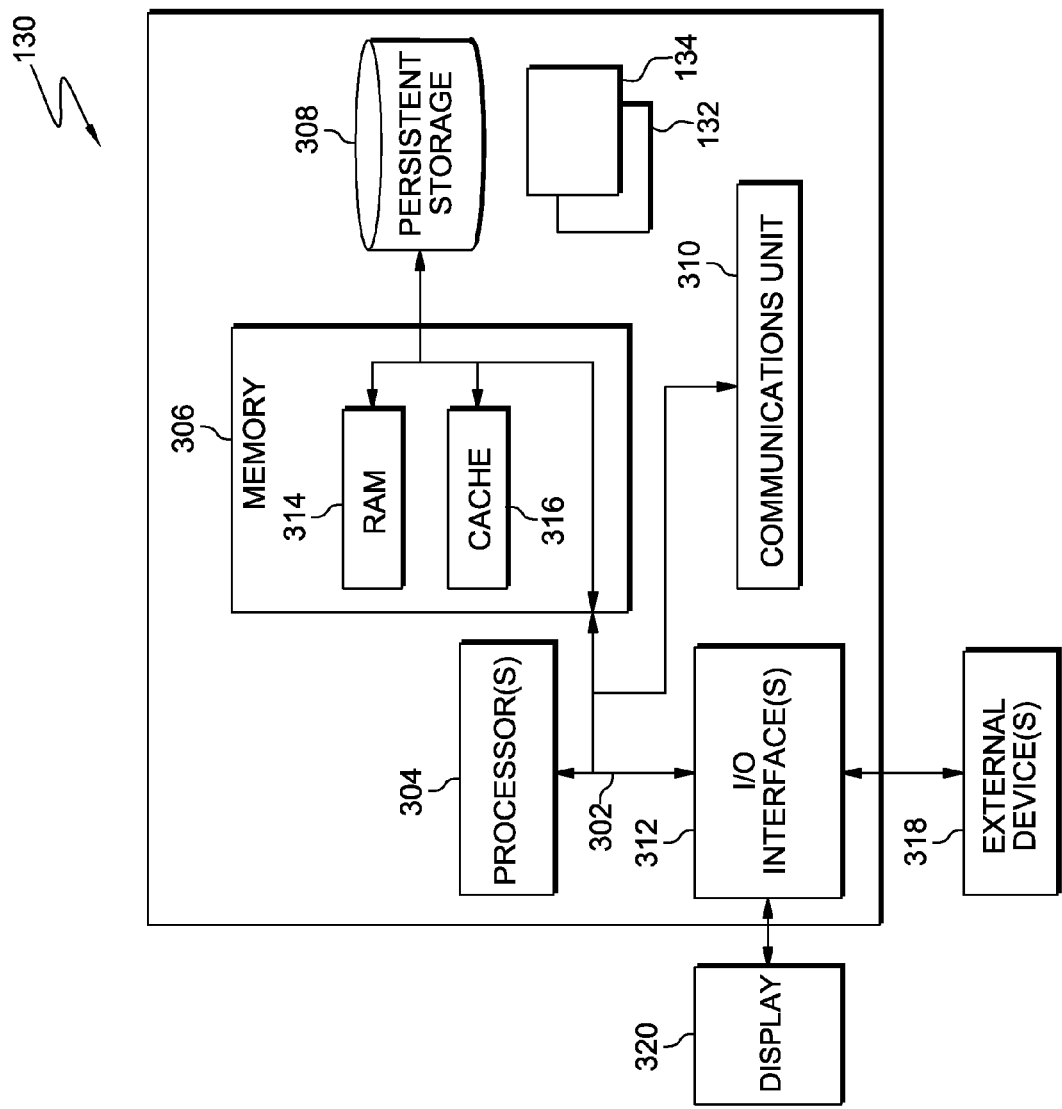
FIG. 3 depicts a block diagram of components of a data processing system, such as the server computing device of FIG. 1, in accordance with an embodiment of the present invention.

FIG. 3 depicts a block diagram of components of server computing device 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computing device 130 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Feedback program 132 and database 134 can be stored in persistent storage 308 for execution and/or access by one or more of the respective computer processors 304 via one or more memories of memory 306. In this illustrated embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including user computing device 120. In these examples, communications unit 310 includes one or more network interface cards. Communications unit 310 may provide communications through the use of either or both physical and wireless communications links. Feedback program 132 and database 134 may be downloaded to persistent storage 308 through communications unit 310.

I/O interface(s) 312 allows for input and output of data with other devices that may be connected to server computing device 130. For example, I/O interface(s) 312 may provide a connection to external device(s) 318 such as a keyboard, keypad, a touch screen, and/or some other suitable input device. External device(s) 318 can also include portable computer-readable storage media such as, for example, thumb drives, portable optical or magnetic disks, and memory cards. Software and data used to practice embodiments of the present invention, e.g., feedback program 132 and database 134, can be stored on such portable computer-readable storage media and can be loaded onto persistent storage 308 via I/O interface(s) 312. I/O interface (s) 312 also connect to a display 320. Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing targeted feedback, the method comprising:
   receiving, by one or more computer processors, a goal desired as a result of an exchange of information between a plurality of users engaged in one or more cognitive thinking tasks, wherein the goal is provided by a user with an interest in the result of the exchange of information and includes one of: convergent thinking, divergent thinking, and targeted thinking, and wherein the exchange of information between the plurality of users is a discussion among the plurality of users aimed at solving a problem;
   monitoring, by the one or more computer processors, the exchange of information between the plurality of users;
   recording, by the one or more computer processors, the information exchanged between the plurality of users;
   determining, by the one or more computer processors, one or more keywords from the recorded information;
   mapping, by the one or more computer processors, the one or more keywords in a database storing ontological relationships wherein mapping includes indexing the one or more keywords and mapping the one or more keywords in the database storing ontological relationships;
   determining, by the one or more computer processors, based, at least in part, on the received goal, the one or more keywords, and the stored ontological relationships, targeted feedback for the plurality of users, wherein the targeted feedback is aimed at producing priming effects on the plurality of users and the targeted feedback is targeted at guiding the plurality of users to solving the problem; and
   providing, by the one or more computer processors, the determined targeted feedback to the plurality of users in order to alter subsequent behavior in a manner desired by the goal by guiding the plurality of users to solving the problem.

2. The method of claim 1, wherein providing the determined targeted feedback includes one or more of: displaying text, displaying images, and providing auditory stimulus.

3. A computer program product for providing targeted feedback, the computer program product comprising:
   one or more computer-readable storage media and program instructions stored on the one or more computer-readable storage media, the program instructions comprising:
   program instructions to receive a goal desired as a result of an exchange of information between a plurality of users engaged in one or more cognitive thinking tasks, wherein the goal is provided by a user with an interest in the result of the exchange of information and includes one of: convergent thinking, divergent thinking, and targeted thinking, and wherein the exchange of information between the plurality of users is a discussion among the plurality of users aimed at solving a problem;
   program instructions to monitor the exchange of information between the plurality of users;
   program instructions to record the information exchanged between the plurality of users;
   program instructions to determine one or more keywords from the recorded information;

program instructions to map the one or more keywords in a database storing ontological relationships, wherein the program instructions to map the one or more keywords include program instructions to index the one or more keywords and program instructions to map the one or more keywords in the database storing ontological relationships;

program instructions to determine based, at least in part, on the received goal, the one or more keywords, and the stored ontological relationships, targeted feedback for the plurality of users, wherein the targeted feedback is aimed at producing priming effects on the plurality of users and the targeted feedback is targeted at guiding the plurality of users to solving the problem; and program instructions to provide the determined targeted feedback to the plurality of users in order to alter subsequent behavior in a manner desired by the goal by guiding the plurality of users to solving the problem.

4. The computer program product of claim 3, wherein the program instructions to provide the determined targeted feedback include one or more of: displaying text, displaying images, and providing auditory stimulus.

5. A computer system for providing targeted feedback based on a goal of the feedback, the computer system comprising:

one or more computer processors;

one or more computer-readable storage media;

program instructions stored on the one or more computer-readable storage media for execution by at least one of the one or more computer processors, the program instructions comprising:

program instructions to receive a goal desired as a result of an exchange of information between a plurality of users engaged in one or more cognitive thinking tasks, wherein the goal is provided by a user with an interest in the result of the exchange of information and includes one of: convergent thinking, divergent thinking, and targeted thinking, and wherein the exchange of information between the plurality of users is a discussion among the plurality of users aimed at solving a problem;

program instructions to monitor the exchange of information between the plurality of users;

program instructions to record the information exchanged between the plurality of users;

program instructions to determine one or more keywords from the recorded information;

program instructions to map the one or more keywords in a database storing ontological relationships, wherein the program instructions to map the one or more keywords include program instructions to index the one or more keywords and program instructions to map the one or more keywords at least one indexed term in the database storing ontological relationships;

program instructions to determine based, at least in part, on the received goal, the one or more keywords, and the stored ontological relationships, targeted feedback for the plurality of users, wherein the targeted feedback is aimed at producing priming effects on the plurality of users and the targeted feedback is targeted at guiding the plurality of users to solving the problem; and program instructions to provide the determined targeted feedback to the plurality of users in order to alter subsequent behavior in a manner desired by the goal by guiding the plurality of users to solving the problem.

6. The computer system of claim 5, wherein the program instructions to provide the determined targeted feedback include one or more of: displaying text, displaying images, and providing auditory stimulus.

\* \* \* \* \*